Oct. 3, 1933.  G. K. LEWIS  1,928,902
COMPOSITE PANEL JOINT CONSTRUCTION
Filed Feb. 5, 1931   2 Sheets-Sheet 1
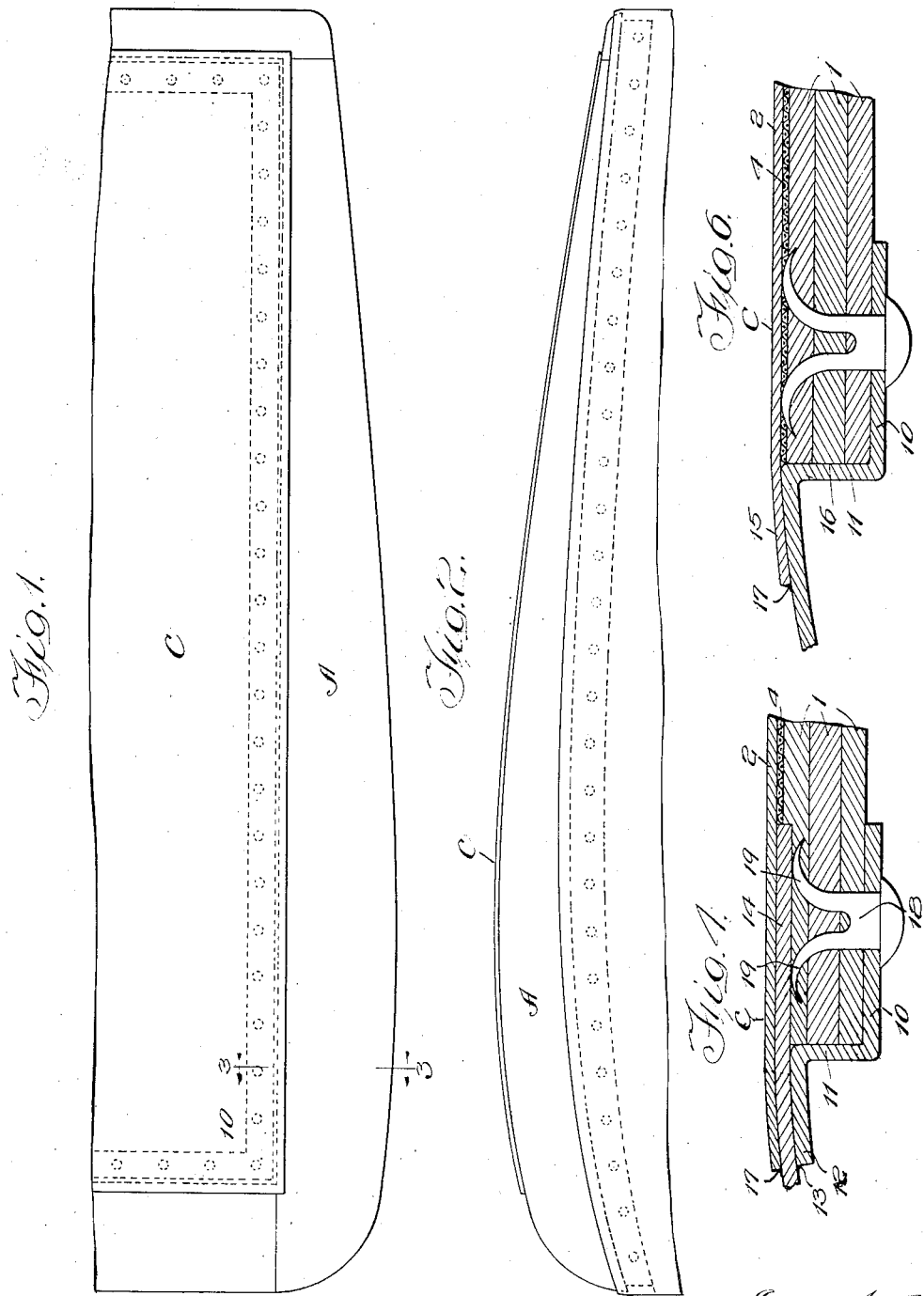

Oct. 3, 1933.                G. K. LEWIS                1,928,902
                 COMPOSITE PANEL JOINT CONSTRUCTION
                    Filed Feb. 5, 1931         2 Sheets-Sheet 2
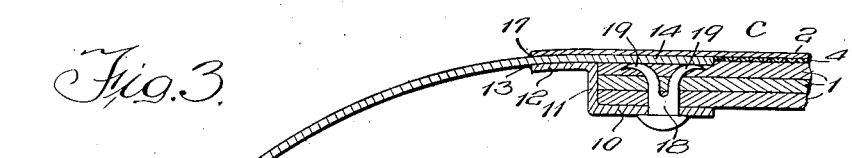
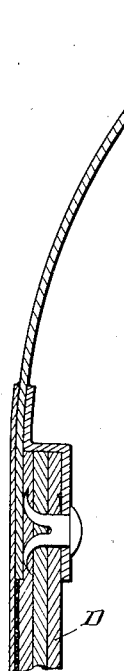
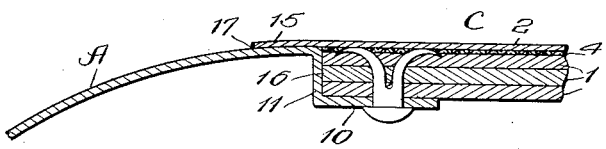
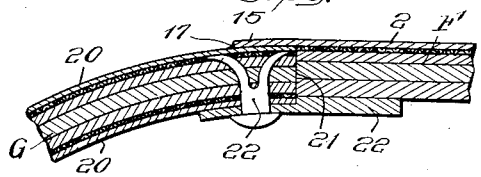
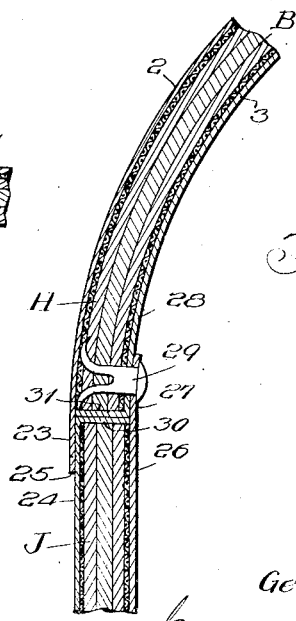
Witness:
William P. Kilroy
Inventor
George K. Lewis
George I. Haight
Atty.

Patented Oct. 3, 1933

1,928,902

UNITED STATES PATENT OFFICE 1,928,902

COMPOSITE PANEL JOINT CONSTRUCTION

George K. Lewis, Chicago, Ill., assignor to Carrol C. Kendrick, Chicago, Ill.

Application February 5, 1931. Serial No. 513,653

4 Claims. (Cl. 296—137)

My invention relates to improvements in joints for the composite panels or laminated members employed in the construction of vehicle bodies.

The principal object of the invention is to provide an improved joint for assembling or fabricating the parts of vehicle bodies from composite laminated panels or members.

A further object of my invention is to join the laminated parts of vehicle bodies in such manner that the structure has unusual strength and so co-ordinates the assembled parts that additional framing for the body is unnecessary.

Other objects of my invention will appear hereinafter.

Referring to the accompanying drawings,

Fig. 1 is a top plan view of a portion of a vehicle body top, showing the roof and roof-rail joined together in accordance with my invention;

Fig. 2 is a view in side elevation of the roof-rail shown in Fig. 1, including a portion of the side panel of the body;

Fig. 3 is an enlarged detail section through the roof-rail and a portion of the roof and side panel, on the line 3—3 of Fig. 1;

Fig. 4 is a still further enlarged detail section of the roof joint shown in Fig. 3;

Fig. 5 is a detail section, similar to the roof joint shown in Fig. 3, of a slightly modified joint structure;

Fig. 6 is a still further enlarged detail section, similar to Fig. 4, of the modified joint structure shown in Fig. 5;

Fig. 7 is a detail section of a joint between a laminated panel having metal sheathing on one side only, and a roof-rail having metal sheathing on both sides; and Fig. 8 is a detail section of the joint between laminated panels for both the roof-rail and side wall of the body, having metal sheathing on both sides of the panels.

Laminated composite panels of the type illustrated in the drawings are composed of superposed layers 1 of wood or other suitable fibrous material, glued together and provided with sheet metal laminations or sheathings 2 and 3 on the outer surfaces. The metal sheathing on the outside is bonded to the composite core of wood or fibrous materials by means of a layer of fabric 4, such as canton flannel. In the manufacture of these panels the several layers of wood or fibrous material constituting the core or body are laid with their grain in opposite direction and the metal sheathings are placed on the outside surfaces of the core with the fabric bonding material interposed between the body and the metal sheathing, and the whole structure compressed into intimate contact to form a panel of unusual strength combined with lightness in weight.

Composite panels of this character are especially adaptable for use in building enclosed vehicle bodies. The panels are originally manufactured in flat condition but they can be bent or formed to various curves necessary in vehicle bodies.

In some instances panels are used which have sheet metal sheathing on one side only, such as shown in Figs. 3 to 6, whereas, in other instances, panels are used which have sheet metal sheathing on both sides, as shown in Figs. 7 and 8.

The panels are generally used for the roof and sides and ends of the vehicle body, and the roof and side panels are joined to a roof-rail A, which, as shown in Fig. 3, for instance, may consist of a single sheet of metal formed to the proper curvature; in other instances, the roof-rail B may be formed of composite paneling similar to the roof and side panels, as shown in Figs. 7 and 8. The roof-rail which is formed of composite paneling may be made as a separate piece or it may consist of an integral continuation of either the side panel or roof panel by curving the side panel or roof panel to the proper curvature. In either of these latter two cases, however, at least one joint is necessary between the roof-rail proper and the side panel or the roof panel, as the case may be. Where the roof-rail is made as a separate member, either as a single sheet of metal or as a composite panel, joints are necessary between this roof-rail and the side and roof panels.

Referring more particularly to Figs. 3 to 6, I have shown my improved joint construction in connection with a single sheet metal roof-rail and composite roof and side panels having sheet metal sheathings 2 on one side only. The edge portion of the roof-rail, extending longitudinally of the body structure, is provided with an offset portion or flange 10 substantially the thickness of the roof panel, which provides a longitudinal recess or channel for the edge portion of said roof panel. In section this offset portion is Z-shape in form. Against the middle portion 11 the edge of the roof panel C is abutted. This Z-shaped offset of the roof-rail may be made integral with the rail A, as shown in Fig. 6, or it may be formed as a separate member having the intermediate portion 11 and the two flanges 10 and 12, as shown in Fig. 4. In the latter form the flange 12 is permanently secured to the roof-rail proper preferably by means of a continuous or a spot-welded joint indicated at 13 along the edge, thus becoming in effect an integral part of the roof-rail proper.

In the event that the structure is made like that in Fig. 4, I prefer to extend the edge portion 14 of the roof-rail proper as far as the offset flange 10, thus providing a channel for the reception of the panel edge formed between the extended edge portion 14 and the offset flange 10. The wood core or body of the panel immediately adjacent the outer metal sheathing is slotted out to provide a recess for the extended edge portion 14 of the roof-rail, this slotting being formed before the roof-rail and roof panel are assembled.

The edge of the panel is also first prepared so that the outer metal sheathing 2 has its edge portion 15 extended beyond the edge 16 of the core, whereby the extended portion 15 will overlap the outer surface of the roof-rail beyond the abutting edges of the panel core and the offset middle portion 11 of the roof-rail. When the parts are assembled, the extended portion 15 of the metal sheathing of the panel is fastened to the roof-rail proper. This is preferably done by a continuous or spot-weld operation along the edge 17 of the extended portion 15, thus forming an integral union between the roof-rail and the metal sheathing of the panel.

In order to lock the panel in the channel provided by the offset flange 10 of the roof-rail, holes are drilled or punched at intervals through the flange, and split or bifurcated rivets 18 are driven through these holes into the panel body. These rivets, as is well known, have prongs 19 which, as the rivets are driven into the panel, divide and curl around to form hooks which bury themselves in the wood core of the panel and thus interlock the panel to the roof-rail. In driving in the rivets, the prongs strike the metal of the roof-rail extension 14 of Fig. 4 or the metal sheathing 2 of Fig. 6 which serve as anvils causing the prongs to spread and curl into the body. No portion of the rivets or their prongs are exposed on the outer surface of the structure, but a very effective method of interlocking the panel and roof member is thus provided. In addition to this, the metal offset flange 10 of the roof-rail provides a firm metal backing against which the heads of the rivets abut and by which they are prevented from sinking into the panel.

In the structure of Fig. 3, the side panel D is shown as joined to the roof-rail A in the manner just described in connection with the joint between the roof-rail and the roof panel, and hence needs no further description.

In the structure shown in Fig. 7, a roof panel F having a single metal sheathing 2 on its upper side only is shown as joined to a roof-rail G of laminated construction having metal sheathing 20 on both sides. In this instance, the roof panel F and the roof-rail have their edges 21 abutted together and the outer metal sheathing 2 of the roof panel has its extended portion 15 overlapping the outer sheathing 20 of the roof-rail and welded at its edges 17 to said sheathing 20 in the same manner as heretofore described in connection with Fig. 4.

In this structure, however, a bar 22 is provided along the joint, wide enough to overlap the edge portions of both the roof panel and the roof-rail on the inner surfaces thereof, thus providing a channel along the edge of the roof-rail in which the edge portion of the roof panel is positioned. Split rivets 22 are also provided at intervals along the joint, the rivets being inserted through the bar 22 and into the roof-rail to hold the joint bar in place.

In the structure shown in Fig. 8, both the roof-rail and the side panel are provided with metal sheathing on both sides. The roof-rail H has the edge portion 23 of the outer sheathing extended beyond its core to overlap the outer sheathing 24 of the side panel J, and this extended portion 23 is welded to the sheathing 24 along the edge 25 in the manner previously described. The inner sheathing 26 of the side panel has a portion 27 extended beyond the end of its core to overlap the inner metal sheathing 28 of the roof panel. A series of split rivets 29 are inserted through the extended portions 27 and into the core of the roof-rail panel to interlock the roof-rail panel to the side panel. In this structure, the edge portion 30 of the outer sheathing of the side panel J and the edge portion 31 of the inner sheathing of the roof-rail panel are turned at right angles over the edges of their respective cores, and these right-angled portions are abutted together.

I have found that joints made in the manner described are as rigid and strong as any of the rest of the panel structure, and that as a result no separate re-inforcement is necessary and the use of separate framing for the body can be entirely eliminated.

I claim:

1. In a structure of the class described, the combination of a composite laminated panel composed of a wood core and metal sheathing having its metal sheathing extended beyond the edge of the core, a member abutting the edge of the wood core of the panel and having a portion extending to and in overlapping relation and welded to said sheathing extension, and having means in overlapping relation to the said panel on the side thereof opposite the sheet metal extension, and rivets extending through said overlapping means and clinched in said core for securing said member to said panel.

2. The combination of a composite laminated panel comprising a body of laminations of fibrous material and an outer sheet metal lamination extended in the plane of itself beyond the edge of the body, a member arranged with its edge in abutting relation to the edge of said laminated body and with its surface substantially flush with the surface of the body and in overlapping relation to said sheet metal extension and welded to said sheet metal extension beyond the abutting edges of said body and member, a flange carried by said member in overlapping relation to the surface of said panel on the side thereof opposite the sheet metal extension, and split rivets extending through said flange and clinched in the body for securing said flange to said laminated body.

3. In a vehicle body, the combination of a roof-rail having an offset flange disposed adjacent its edge to form a channel, a composite panel having its marginal portion in said channel and comprising a body portion and a sheet metal lamination on its outer surface extending beyond the edge of the body and overlying the surface of said rail in substantially the plane of the surface thereof, said body having a slot therein adjacent the sheet metal lamination into which said roof-rail extends, and welded means securing the sheet metal extension of the panel to the roof-rail beyond the offset flange.

4. In a vehicle body, the combination of a roof-rail having an offset flange disposed adjacent its edge to form a marginal recess, a composite panel comprising a body portion and a sheet metal lamination on its outer surface positioned in said recess in edgewise abutting relation to the wall of said recess so that the outer surface of the body is in substantially the plane of the outer surface of the rail, said sheet metal lamination extending beyond the edge of the body and overlying the outer surface of the rail, said body having a slot therein adjacent the inner face of the sheet metal lamination in which slot said roof-rail is extended, welded means securing the sheet metal extension of the panel to the roof-rail, and a series of split rivets extending through said flange and embedded within the body of the panel and terminating short of the sheet metal lamination.

GEORGE K. LEWIS.